(12) United States Patent
Phan Le et al.

(10) Patent No.: US 11,480,547 B2
(45) Date of Patent: Oct. 25, 2022

(54) LIQUID IMMERSION SENSOR

(71) Applicant: NXP B.V., Eindhoven (NL)

(72) Inventors: Kim Phan Le, Eindhoven (NL); Jozef Thomas Martinus van Beek, Rosmalen (NL); David Camara, Nice (FR)

(73) Assignee: NXP B.V., Eindhoven (NL)

( * ) Notice: Subject to any disclaimer, the term of this patent is extended or adjusted under 35 U.S.C. 154(b) by 290 days.

(21) Appl. No.: 16/451,159

(22) Filed: Jun. 25, 2019

(65) Prior Publication Data
US 2020/0018726 A1   Jan. 16, 2020

(30) Foreign Application Priority Data
Jul. 10, 2018  (EP) .................................... 18305924

(51) Int. Cl.
*G01N 29/02*   (2006.01)
*G01N 29/024*  (2006.01)
*H04M 1/02*    (2006.01)

(52) U.S. Cl.
CPC ........ *G01N 29/024* (2013.01); *H04M 1/0202* (2013.01); *G01N 2291/011* (2013.01); *G01N 2291/022* (2013.01); *G01N 2291/02836* (2013.01); *G01N 2291/02881* (2013.01); *G01N 2291/102* (2013.01); *H04M 2250/12* (2013.01)

(58) Field of Classification Search
CPC ........... G01N 29/024; G01N 2291/011; H04M 1/0202; G01F 23/2961
USPC .......................................................... 73/64.53
See application file for complete search history.

(56) References Cited

U.S. PATENT DOCUMENTS

| | | | |
|---|---|---|---|
| 9,251,686 B1 | 2/2016 | Reich et al. | |
| 2016/0146935 A1 | 5/2016 | Lee et al. | |
| 2017/0003176 A1* | 1/2017 | Phan Le | G01N 29/032 |
| 2017/0010691 A1* | 1/2017 | Morobishi | G06F 3/044 |
| 2018/0181509 A1* | 6/2018 | Jo | H04N 5/2257 |

FOREIGN PATENT DOCUMENTS

| | | | |
|---|---|---|---|
| CN | 103167063 A | | 6/2013 |
| EP | 3112831 A1 | | 1/2017 |
| JP | 2008111774 A | | 5/2008 |
| JP | 2008-199412 A | | 8/2008 |
| JP | 2008199412 | * | 8/2008 |

* cited by examiner

*Primary Examiner* — Tarun Sinha (57) ABSTRACT

A liquid immersion sensor for a mobile device with at least two acoustic transducers is described. The liquid immersion sensor may include a signal generator having a signal generator output configured to generate a signal for transmission via a first acoustic transducer, and a signal receiver having a signal receiver input configured to receive a delayed version of the generated signal via a second acoustic transducer. The signal receiver includes a signal receiver output. The liquid immersion sensor includes a controller having a first controller input for receiving a reference signal and a second controller input coupled to the signal receiver output. The controller determines a time lag value between the reference signal and the delayed signal and generates a control output signal dependent on the phase difference. The control output signal indicates if the mobile device is immersed in liquid.

14 Claims, 5 Drawing Sheets

LIQUID IMMERSION SENSOR

CROSS-REFERENCE TO RELATED APPLICATIONS

This application claims the priority under 35 U.S.C. § 119 of European patent application no. 18305924.5, filed Jul. 10, 2018 the contents of which are incorporated by reference herein.

FIELD

This disclosure relates to a liquid immersion sensor for a mobile device.

BACKGROUND

One of the biggest failures of consumer electronic handheld devices, such as smartphones, is water damage. Most classical smartphones without a water-resistant feature may be permanently damaged when submersed in water for longer than a few seconds. Many flagship smartphones nowadays come with a water-resistant feature. However, when submersed in water, the touchscreen does not react reliably to user's touch anymore.

Water-resistant phones from some manufactures nowadays are rated with the International Protection Marking, IEC standard 60529 IPx8 mark. The IPx8 mark indicates that the phone can still work to some extent in water, for instance, the phone may be used to take pictures or videos in a swimming pool.

Most smartphones have at least one water indicator placed inside the casing and/or in a USB or headphone jack to detect if a phone has been submersed in water. This is to help service to identify causes of a failure or to void guarantee. This indicator is irreversible, that means once it gets wet, the indicator colour is changed permanently and can't be recovered by drying off.

SUMMARY

Various aspects of the disclosure are defined in the accompanying claims. In a first aspect there is provided a liquid immersion sensor for a mobile device comprising at least two acoustic transducers, the liquid immersion sensor comprising: a signal generator having a signal generator output configured to generate a signal for transmission via a first acoustic transducer; a signal receiver having a signal receiver input configured to receive a delayed version of the generated signal via a second acoustic transducer, the signal receiver further comprising a signal receiver output; and a controller having a first controller input configured to receive a reference signal and a second controller input coupled to the signal receiver output; wherein the controller is configured to determine a time lag value between the reference signal and the delayed signal; and to generate a control output signal dependent on the time lag, the control output signal indicating whether or not the mobile device is immersed in liquid.

In one or more embodiments, the signal generator output may be coupled to the first controller input and wherein the reference signal comprises the generated signal.

In one or more embodiments, the signal receiver may comprise a further signal receiver input configured to receive a further delayed version of the generated signal via a third acoustic transducer and wherein the reference signal comprises the further delayed signal.

In one or more embodiments, the controller may be further configured to compare the determined phase with a predetermined phase value and to generate an output signal indicating whether or not the mobile device is immersed in liquid dependent on the comparison.

In one or more embodiments, the controller may comprise a medium detector having a medium detector input and a medium detector output, and a time-lag detector configured to determine the time delay value, the time-lag detector having time lag output coupled to a medium detector, a first time-lag detector input coupled to the first controller input and a second time-lag detector input coupled to the second controller input, wherein the medium detector is configured to output a signal indicating whether the mobile device is in air or liquid, dependent on a comparison between the time lag value determined by the time lag detector and a predetermined time lag value.

In one or more embodiments, the time lag detector may be configured to output a signal indicating that the mobile device is immersed in liquid if the time lag value is less than the predetermined time lag value.

In one or more embodiments, the liquid immersion sensor may further comprise a temperature calculator having a first temperature calculator input coupled to the medium detector output, a second temperature calculator input coupled to the time lag detector output, wherein in response to the medium detector indicating the mobile device is immersed in liquid, the temperature calculator is configured to determine the liquid temperature from the time lag.

In one or more embodiments, the controller may be configured to determine the time lag by cross-correlation or phase-difference of the received signal and the reference signal.

Embodiments may include a mobile device comprising at least two acoustic transducers coupled to the liquid immersion sensor wherein the signal generator is coupled to the first acoustic transducer and the signal receiver is coupled to the second acoustic transducer.

The mobile device may further comprise a third acoustic transducer, wherein the signal receiver is coupled to the third acoustic transducer.

In one or more embodiments, in response to the control signal output indicating that the mobile device is immersed in liquid, the mobile device may be configured to change to a different mode of operation.

In one or more embodiments, in response to the control signal output indicating that the mobile device is immersed in liquid the mobile device may be configured to determine a liquid flow rate by determining a first speed of sound value from an acoustic signal transmitted in a first direction and a second speed of sound value from an acoustic signal transmitted in at least one second direction.

In a second aspect, there is disclosed, a method of sensing liquid immersion for a mobile device comprising at least two acoustic transducers, the method comprising generating a signal for transmission via a first acoustic transducer; receiving a delayed version of the generated signal via a second acoustic transducer, determining a time lag value between a reference signal and the delayed signal; and generating a control output signal dependent on the time lag, the control output signal indicating whether or not the mobile device is immersed in liquid.

In one or more embodiments, the reference signal may comprise the generated signal.

In one or more embodiments, the method may further comprise receiving a further delayed version of the generated signal via a third acoustic transducer and wherein the reference signal comprises the further delayed signal.

In one or more embodiments, the method may further comprise, in response to the control signal output indicating that the mobile device is immersed in liquid, determining the liquid temperature from the time lag value.

In a third aspect there is described a computer program product comprising instructions which, when being executed by a processing unit, cause said processing unit to perform the steps of generating a signal for transmission via a first acoustic transducer; receiving a delayed version of the generated signal via a second acoustic transducer, determining a time lag value between a reference signal and the delayed signal; and generating a control output signal dependent on the time lag, the control output signal indicating whether or not the mobile device is immersed in liquid.

BRIEF DESCRIPTION OF THE DRAWINGS

In the figures and description like reference numerals refer to like features. Embodiments are now described in detail, by way of example only, illustrated by the accompanying drawings in which.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

DESCRIPTION

Figure 1A:
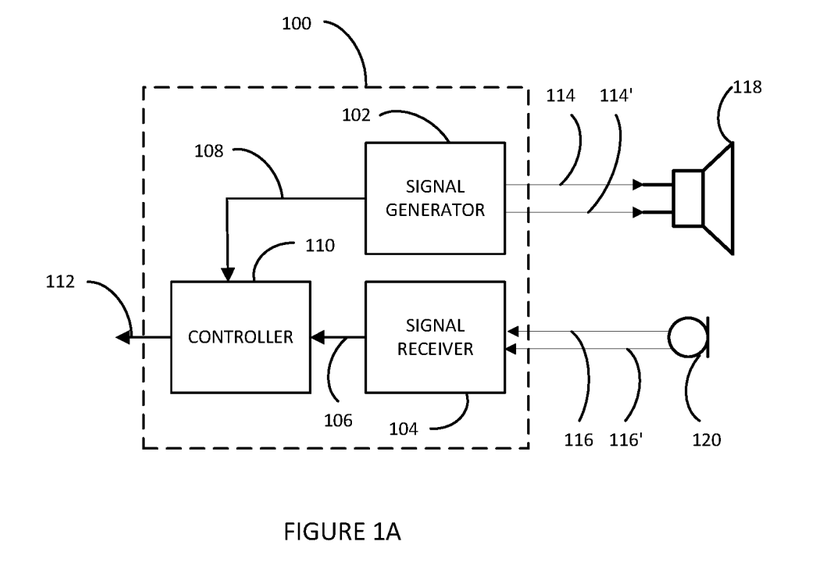
FIG. 1A shows a water immersion detector according to an embodiment.

FIG. 1A shows a water immersion detector 100. A signal generator 102 may have a first output 108 connected to a controller 110. The signal generator 102 may have a pair of differential outputs 114, 114'. A signal receiver 104 may have a pair of differential inputs 116, 116'. The signal receiver 104 may have an output 106 connected to the controller 110. The controller 110 may have a controller output 112. In operation the signal generator outputs 114, 114' may be connected to a loudspeaker 118 and the signal receiver differential inputs 116, 116' may be connected to a microphone 120. The microphone 120 and the loudspeaker 118 are a predetermined distance d apart. In other examples, the signal generator 102 and the signal receiver 104 may have single outputs and inputs rather than differential outputs and inputs. The microphone 120 and loudspeaker 118 may be electrodynamic, piezoelectric or other acoustic transducer. In some examples the microphone 120 may be replaced by a speaker used as a microphone. In some examples one or both of the signal generator outputs 114, 114' may be connected to the controller in which case the additional signal generator output 108 may be omitted. The loudspeaker 118 may be an omnidirectional sound emitter.

The signal generator 102 may generate an acoustic signal which may be emitted by the loudspeaker 118. In some examples, the generated signal may be a periodic waveform, such as a sinusoid, square wave, sawtooth wave. In other examples, the generated signal may be a non-periodic waveform, such as a chirp, or pulses. In other examples a noise-like signal, such as pseudo-random noise may be generated. The frequency range of the acoustic signal may be in any range, such infrasonic, audible, or ultrasonic.

The generated signal may also be received by the controller 110. The emitted acoustic signal from the loudspeaker 118 may be detected by the microphone 120. The signal receiver 104 may detect the emitted acoustic signal via the microphone 120 and output a received acoustic signal on the signal receiver output 106.

The controller 110 may determine a time lag between the generated signal and the received acoustic signal. In some examples, the time lag may be equal to a phase difference between the generated signal and the received acoustic signal. From the time lag, the controller 110 may determine a time of flight of the acoustic signal between the loudspeaker 118 and the microphone 120. This time of flight value corresponds to a measure of the speed of sound in the medium in which the speaker 118 and microphone 120 are immersed. Dependant on the value of the speed of sound, the controller 110 may output a signal on the controller output 112 indicating whether the device including the water immersion sensor 110 is in water or air.

The speed of sound in an ideal gas can be expressed by the following equation:

$$c_{air} = \sqrt{(\gamma k T/m)} \, (m/s) \quad (1)$$

in which $\gamma$ is the adiabatic index, k is the Boltzmann constant, T is the absolute temperature in Kelvin, and m is the is the mass of a single gas molecule in kilograms. For dry air, the formula can be simplified to:

$$c_{dry\text{-}air} = 20.05\sqrt{T} \, (m/s) \quad (2)$$

At room temperature (22° C.), speed of sound in dry air is 344 m/s.

In fresh water, speed of sound ($c_{water}$) follows an empirical formula described by W. Marczak in "Water as a standard in the measurements of speed of sound in liquids", J. Acoust. Soc. Am. 102(5) pp 2776-2779, 1997 and shown in equation 3 below:

$$c_{water} = 1.402385 \times 10^3 + 5.038813 \times T_c - 5.799136 \times 10^{-2} \times T_c^2 + 3.287156 \times 10^{-4} \times T_c^3 - 1.398845 \times 10^{-6} \times T_c^4 + 2.787860 \times 10^{-9} \times T_c^5 \quad (3)$$

where Tc is water temperature in Celsius. At room temperature, the speed of sound in fresh water is 1488 m/s.

Figure 1B:
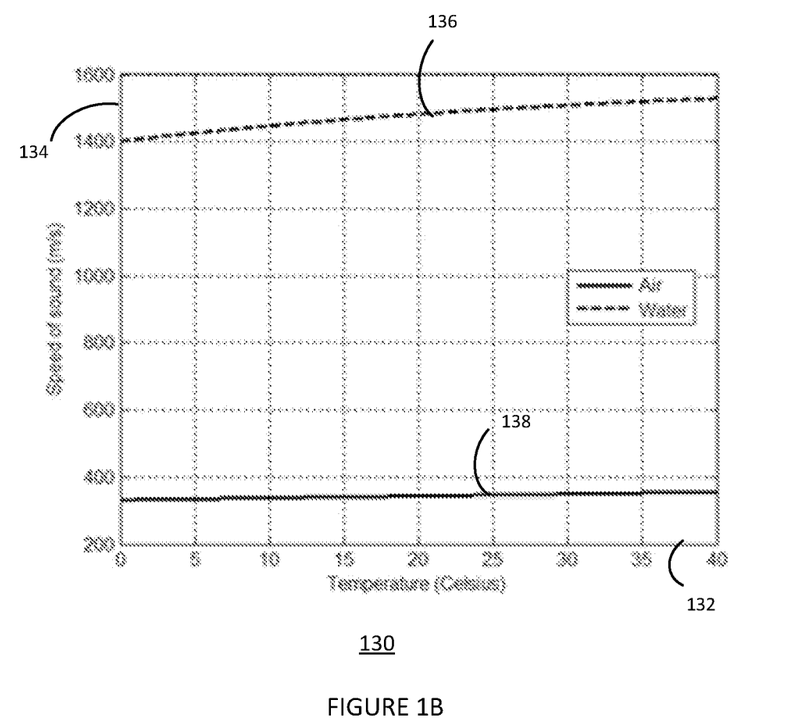
FIG. 1B illustrates the variation of the speed of sound with temperature in water and air.

FIG. 1B illustrates a graph 130 showing the variation of the speed of sound in air and pure or distilled water with respect to temperature. The x-axis 132 shows the temperature in the range of 0 degrees Celsius to 40 degrees Celsius. The y-axis 134 show the speed of sound in the range between 200 m/s to 1600 m/s. Line 136 shows the speed of sound in water varying between approximately 1400 m/s at 0 degrees Celsius to approximately 1500 m/s at 40 degrees Celsius. Line 138 shows the speed of sound in air varying between approximately 330 m/s at 0 degrees Celsius to approximately 355 m/s at 40 degrees Celsius.

Within the whole consumer temperature range between 0 degrees and 40 degrees, the speed of sound in water is very distinct from that in air, typically a factor of about 4 times. The inventors of the present disclosure have appreciated that the water immersion detector 100 may be implemented using existing components in a mobile device and used to detect whether or not the device is immersed in water by determining a time lag value θ and comparing it with a reference value $\theta_{ref}$.

If $\theta > \theta_{ref}$, the controller 110 outputs a signal indicating that the medium is air, and if $\theta < \theta_{ref}$, the controller 110 outputs a signal that the medium is water. $\theta_{ref}$ must be selected such that speed of sound $c_{ref}$ calculated from this time lag reference and the distance d between the emitter and the receiver $c_{ref} = d/\theta_{ref}$ is significantly larger than the largest speed of sound in air at all temperatures of interest and significantly smaller than the smallest speed of sound in water at all temperature of interest. For example, values of $c_{ref}$ in the range of 500 m/s $< c_{ref} <$ 1300 m/s, or more preferably 800 m/s $< c_{ref} <$ 1000 m/s may be considered to indicate that the medium is water.

The water immersion sensor 100 may be implemented using hardware or a combination of hardware and software. The signal generator 102 and the signal receiver 104 may be implemented using hardware and a combination of hardware and software. The controller 110 may be implemented in hardware or software running on a processor such as a digital signal processor.

In most mobile devices, such as smartphones or tablets, there are usually several speakers and microphones at different locations. For example, in smartphones there is usually a loudspeaker for ringtones and music playback usually located near the bottom side and a microphone for voice recorder located at the top edge. The distance between the speaker and the microphone is fixed and usually between 8 and 15 cm depending on the size of the phone.

When included in a mobile device such as a smart phone, the control output 112 of the water immersion detector 100 may provide an indication of water immersion to the operating system (OS) of the mobile device. The OS may further trigger a number of necessary actions to adapt to the medium. For instance, in a non-water-resistant phone, if contact with water is detected, the OS may immediately power down the whole system to avoid short circuit. In water-resistant phones, the phones can survive in water but with limited operational capabilities. In this case, the OS may, for instance, put the system to stand-by to avoid further damage. Alternatively, or in addition, in some examples, in response to the water immersion detector 100 indicating water immersion, the mobile device may change operating mode to a low-power consumption mode. Alternatively, or in addition, in some examples, in response to the water immersion detector 100 indicating water immersion, the mobile device may switch off or lower the touch sensitivity of the touch display, for example to avoid unwanted input commands when the device is immersed in water.

Figure 2:
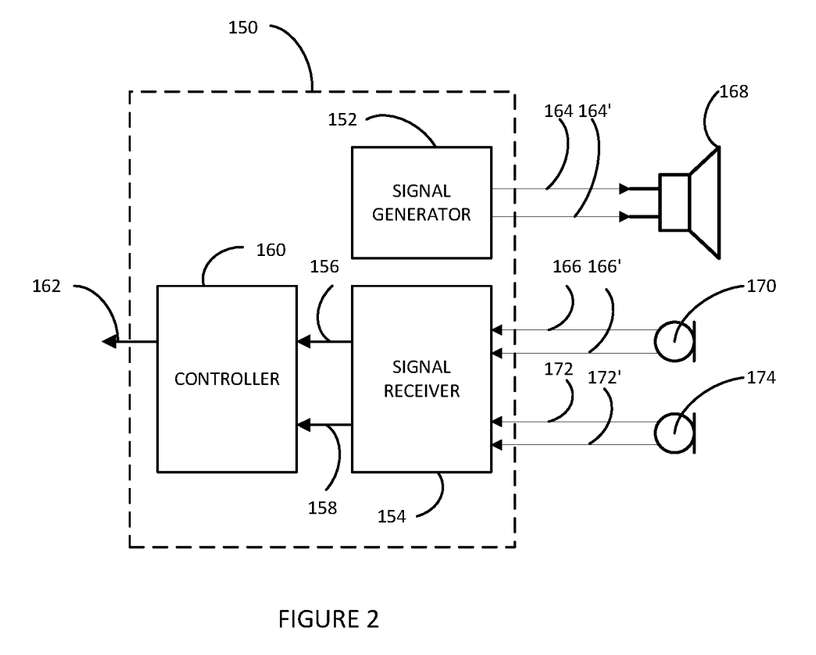
FIG. 2 illustrates a water immersion detector according to an embodiment.

FIG. 2 shows a water immersion detector 150. A signal generator 152 may have a pair of differential outputs 164, 164'. A signal receiver 154 may have a first pair of differential inputs 166, 166'. The signal receiver 154 may have a second pair of differential inputs 172, 172'. The signal receiver 154 may have a first output 156 connected to the controller 160. The signal receiver 154 may have a second output 158 connected to the controller 160. The controller 160 may have a controller output 162.

In operation the signal generator outputs 164, 164' may be connected to a loudspeaker 168. The signal receiver first differential inputs 166, 166' may be connected to a first microphone 170. The signal receiver second differential inputs 172, 172' may be connected to a second microphone 174.

The signal generator 152 may generate an acoustic signal which may be emitted by the loudspeaker 168. The loudspeaker or speaker 168, the first microphone 170 and the second microphone 174 are predetermined distance apart. The path difference d for an acoustic signal is the difference between the distance of the first microphone 170 and speaker 168, and the second microphone 174 and speaker 168. In some examples, the generated signal may be a periodic waveform, such as a sinusoid, square wave, sawtooth wave. In other examples, the generated signal may be a non-periodic waveform, such as a chirp, or pulses. In other examples a noise-like signal, such as pseudo-random noise may be generated. The frequency range of the acoustic signal may be in any range, such infrasonic, audible, or ultrasonic.

The emitted acoustic signal from the loudspeaker 168 may be detected by the microphone 170. The signal receiver 154 may detect the emitted acoustic signal via the first microphone 170 and output a first received acoustic signal on the first signal receiver output 156. The signal receiver 154 may detect the emitted acoustic signal via the second microphone 174 and output a second received acoustic signal on the second signal receiver output 158.

The controller 160 may determine a time lag between the first received acoustic signal and the second received acoustic signal due to the different time-of-flight between an acoustic signal traveling from the loudspeaker 168 to the first microphone 170 and that traveling from the loudspeaker 168 to the second microphone 174. One of the first received acoustic signal and the second received acoustic signal may be considered a reference signal from which the relative time lag is determined. From the time lag, the controller 160 may determine a value for time of flight difference between an acoustic signal travelling from the loudspeaker 168 to the first microphone 170 and from the loudspeaker 168 to the second microphone 174. This time of flight value corresponds to a measure of the speed of sound in the medium in which the first microphone 170 and the second microphone 174 are immersed. In other examples, the liquid immersion detector may transmit an acoustic signal via two loudspeakers and detect the transmitted acoustic signals via one microphone. The difference in distances from the microphone to the first speaker and from the microphone to the second speaker is the predetermined path length d. During operation, different acoustic signals may be sequentially transmitted by the two speakers, and arrive at the microphone with a different time lag. In some examples the signals may be transmitted simultaneously, if they are not correlated. The liquid immersion detector may determine the difference between the time lags and determine the speed of sound in the medium from the time lag difference and the predetermined path delay d.

The time lag may be determined for example by cross-correlation, lock-in amplifier, Fourier transform, or phase detector as described in European Patent application 15174828.2.

If the time delay $\theta > \theta_{ref}$, the controller 160 outputs a signal on the controller output 162 indicating that the medium is air. If $\theta < \theta_{ref}$, then the controller 160 outputs a signal on the controller output 162 indicating that the medium is water. $\theta_{ref}$ must be selected such that speed of sound $c_{ref}$ calculated from this time lag reference and the path difference d $c_{ref}=d/\theta_{ref}$ is significantly larger than the largest speed of sound in air at all temperatures of interest and significantly smaller than the smallest speed of sound in water at all temperature of interest. For example, values of $c_{ref}$ in the range of 500 m/s<$c_{ref}$<1300 m/s, or more preferably 800 m/s<$c_{ref}$<1000 m/s may be considered to indicate that the medium is water.

Figure 3:
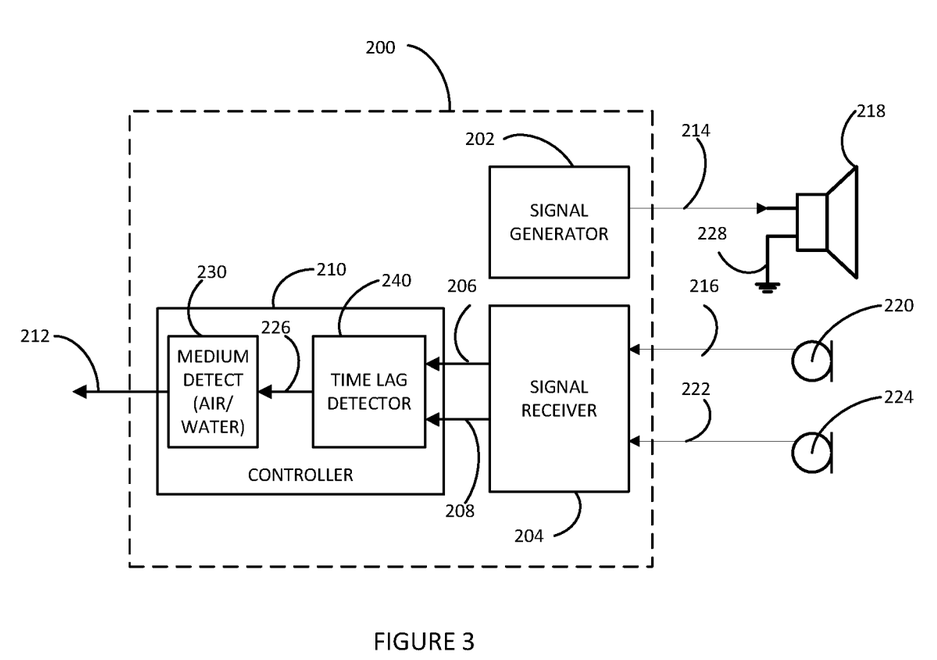
FIG. 3 shows a water immersion detector according to an embodiment.

FIG. 3 shows a water immersion detector 200 including a signal generator 202, a signal receiver 204 and a controller 210. The controller 210 includes a time lag detector 240 and a medium detector 230.

The signal or waveform generator 202 may have an output 214. The signal receiver 204 may have a first input 216. The signal receiver 204 may have a second input 222. The signal receiver 204 may have a first output 206 connected to the timelag detector 240. The signal receiver 204 may have a second output 208 connected to the to the timelag detector 240. The time lag detector output 226 may be connected to the medium detector 230. The medium detector output may be connected to the controller output 212.

In operation the signal generator output 214 may be connected to a first terminal of a loudspeaker 218. A second terminal of the loudspeaker 218 may be connected to ground 228. The signal receiver first input 216 may be connected to a first microphone 220. The signal receiver second input 222 may be connected to a second microphone 224.

The signal generator 202 may generate an acoustic signal which may be emitted by the loudspeaker 218. The loudspeaker 218, the first microphone 220 and the second microphone 224 are predetermined distance apart. The path difference d for an acoustic signal is the difference between the distance of first microphone 220 and speaker 218, and the distance of the second microphone 224 and speaker 218.

The signal receiver 204 may detect the emitted acoustic signal via the first microphone 220 and output a first received acoustic signal on the first signal receiver output 206. The signal receiver 204 may detect the emitted acoustic signal via the second microphone 224 and output a second received acoustic signal on the second signal receiver output 208. The signal receiver 204 may convert the signals to a digital signal and optionally filter the digital signal for noise reduction.

The time lag detector 240 may determine a time lag θ between the first received acoustic signal and the second received acoustic signal due to the different time-of-flight of the acoustic signal from the loudspeaker 218 to the first microphone 220 and that to the second microphone 224. One of the first received acoustic signal and the second received acoustic signal may be considered a reference signal from which the relative time lag is determined.

Any suitable algorithm or signal processing technique may be used to detect the time lag of the signals. A typical technique is cross-correlation. The cross-correlation time shifts the first received signal with respect to the second received signal in the time axis and tries to find a matching between them. The resulting maximum occurs when a match is found and the time lag θ between the first received signal and the second received signal corresponds to the time value at the peak. In some examples, the time lag detector 240 may interpolate the cross-correlated signal using any suitable algorithm such as quadratic curve fitting or Gaussian curve fitting to improve the accuracy.

The relative time lag corresponds to a value for the difference in the time of flight of an acoustic signal from the loudspeaker 218 to the first microphone 220 and from the loudspeaker 218 to the second microphone 224. This time of flight value corresponds to a measure of the speed of sound in the medium in which the first microphone 220 and the second microphone 224 are immersed. The time lag detector 240 may output the determined time lag value on the time lag detector output 226.

The medium detector 230 compares the measured time lag value θ with a reference time lag value $\theta_{ref}$ stored in memory. If the time lag $\theta>\theta_{ref}$, the controller 210 may output a signal on the controller output 212 indicating that the medium is air. If $\theta<\theta_{ref}$, then the controller 210 may output a signal on the controller output 212 indicating that the medium is water.

Figure 4:
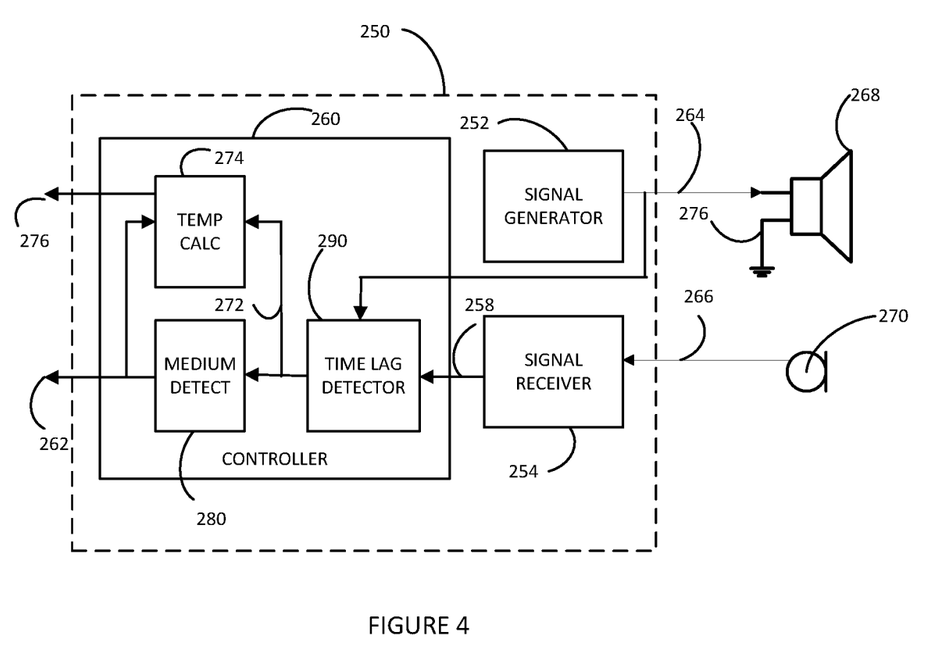
FIG. 4 illustrates a water immersion detector including water temperature measurement according to an embodiment.

FIG. 4 shows a water immersion detector 250 including a signal generator 252, a signal receiver 254 and a controller 260. The controller 260 includes a time lag detector 290, a medium detector 280 and a temperature calculator 274.

The signal or waveform generator 252 may have an output 264 connected to the time lag detector 290. A signal receiver 254 may have an input 266. The signal receiver 204 may have an output 258 connected to the timelag detector 290. The timelag detector output 272 may be connected to the medium detector 280. The time lag detector output 272 may be connected to the temperature calculator 274. The medium detector output may be connected to the controller output 262. The controller output 262 may be connected to the temperature calculator 274.

In operation the signal generator output 264 may be connected to a first terminal of a loudspeaker 268. A second terminal of the loudspeaker 268 may be connected to ground 276. The signal receiver input 266 may be connected to a microphone 270. The signal generator 252 may generate an acoustic signal which may be emitted by the loudspeaker 268.

The signal receiver 274 may detect the emitted acoustic signal via the microphone 270 and output the received acoustic signal on the signal receiver output 258.

The time lag detector 290 may determine a time lag θ between the emitted signal which may be considered the reference signal and the received acoustic signal.

The relative time lag corresponds to a value for time of flight of an acoustic signal between the loudspeaker 268 and the microphone 270. This time of flight value corresponds to a measure of the speed of sound in the medium in which the loudspeaker 268 and the microphone 270 are immersed. The time lag detector 290 may output the determined time lag value on the time lag detector output 272.

The medium detector 280 compares the measured time lag value θ with a reference time lag value $\theta_{ref}$ stored in memory (not shown). If the time lag $\theta>\theta_{ref}$, the controller 260 outputs a signal on the controller output 262 indicating that the medium is air. If $\theta<\theta_{ref}$, then the controller 260 outputs a signal on the controller output 262 indicating that the medium is water.

The temperature calculator 274 may also determine a value of temperature from the time lag value θ together with various calibration parameters from a memory (not shown) and output a water temperature value on the temperature calculator output 276.

In some examples, a value of the water temperature can be calculated from the speed of sound using the relationship in equation 3. Alternatively, the water temperature may be determined or more precisely using a relationship that has been derived from calibration measurements performed for a mobile device including the water immersion sensor during its development in the factory. These calibration measurements may be provided in a look-up table in the temperature calculator 274. The water temperature information is subsequently used further by a circuit or software in the device, such as the operating system, to be shown on the display of the device.

The determination of the water temperature requires that the time lag value θ is determined with greater accuracy than that required to determine whether the medium is air or water. If the sound wave is a periodic waveform, its period should preferably be equal or longer than the total difference in the travel time over the whole temperature range of interest. This is to avoid ambiguity in defining temperature from phase lag information. The following condition is may be satisfied when designing the measurement:

$$T_f = 1/f \geq d/c_1 - d/c_2 \quad (4)$$

in which $T_f$ is the period of the waveform in seconds, f is the frequency in Hz of the repeated waveform patterns, which is the frequency of the waveform if it is sinusoidal, d is the distance in metres between the speaker 268 and the microphone 270, $c_1$ and $c_2$ (in m/s) are the speed of sound in water at the lowest and highest temperatures in the range of interest, respectively. For instance, for consumer electronics, the temperature of interest is from 0° C. to 40° C. Over this temperature range, the speed of sound in water changes from 1402 m/s ($c_1$) to 1529 m/s ($c_2$).

Assuming that in a smartphone including the water immersion sensor 290, the distance between a speaker and a microphone is 12 cm, according to Equation 3, $T_f$ should be equal or larger than 7.1 μs or equivalent to a pattern frequency of equal or lower than 141 kHz. That means, if the waveform is a sinusoid, its frequency should not exceed 141 kHz in order to avoid ambiguity in defining temperature.

Speed of sound in water is affected by flow. When the flow component $v_{flow-comp}$ is in the same direction of sound, the speed of sound increases by $v_{flow-comp}$, that is: $c_{for} = c_0 + v_{flow-comp}$, in which $c_0$ is the speed of sound in still water. When the flow component $v_{flow-comp}$ is in the opposite direction of sound, the speed of sound decreases by $-v_{flow-comp}$, that is $c_{against} = c_0 - v_{flow-comp}$.

To correct the temperature calculation for the effect of flow, the temperature calculator 274 may determine at least two measurements in opposite directions which results in two speeds of sound $c_{for}$ and $c_{against}$. The speed of sound in still water can be calculated by averaging these two speeds: $c_0 = (c_{for} + c_{against})/2$. Knowing $c_0$, water temperature can be calculated.

The measurements in opposite directions can be made by either prompting the user to hold the water immersion sensor 250 at a first direction, and then rotate the device 180° and hold for a short while. During these two steps, measurements are automatically performed. In other examples with multiple speakers and microphones, different pairs of microphones and speakers may be used to make the two measurements without having to rotate the device physically. Examples of the water immersion sensor may be included in a smartphone. In many smartphones, there are two speakers at opposite ends, for example one for music and/or ring tones which may be referred to as the hands-free speaker and the other for phone calls, which may be referred to as the ear-piece speaker, and two microphones at the opposite ends, for example one for use in voice recording and the other for use phone calls. In this case two measurements can be made by subsequently sending sound waves in opposite directions: the first one from the loudspeaker to the voice recorder microphone, and the second one from the ear-piece speaker to the phone call microphone.

Figure 5A:
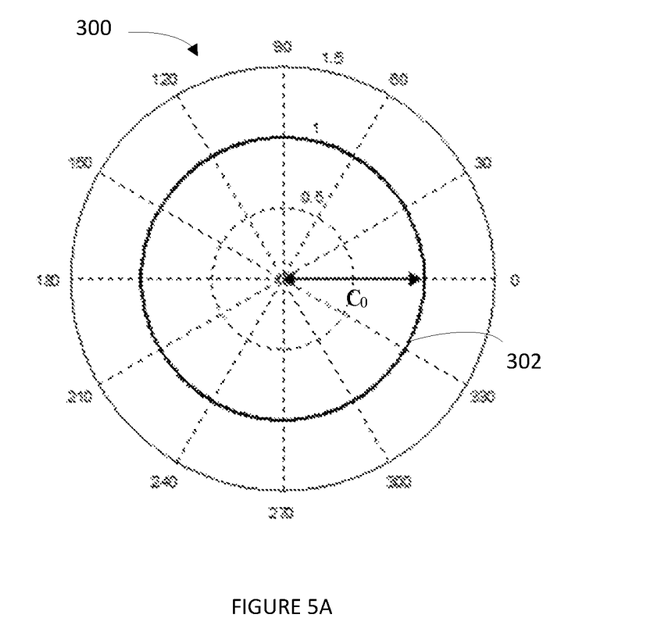
FIG. 5A illustrates a polar plot of speed of sound measurements in still water
Figure 5B:
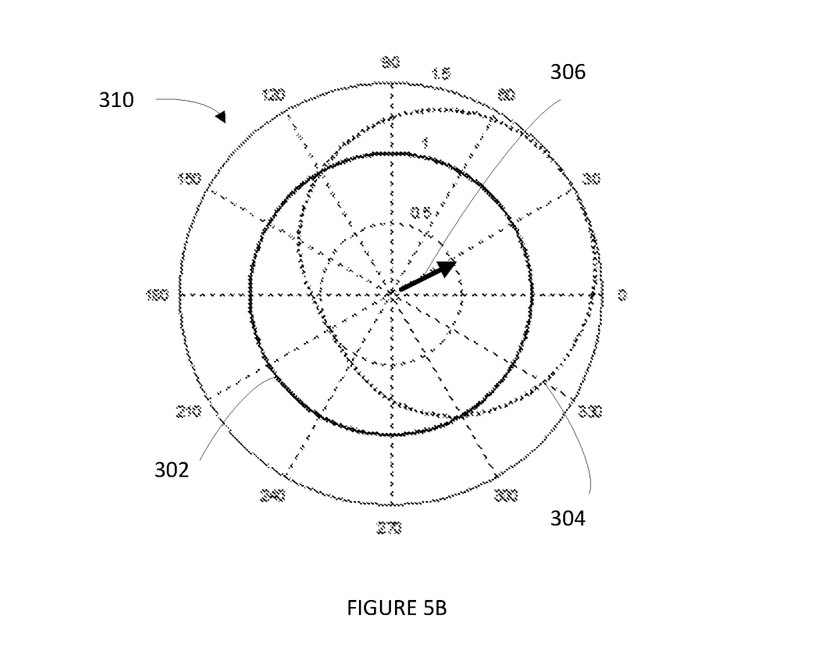
FIG. 5B illustrates a polar plot of speed of sound measurements in flowing water

In another example, the user may be prompted to slowly rotate a device including the water immersion sensor 250 in water over 360°. During the rotation, measurements may be continuously performed. FIG. 5A shows a polar plot representing measurements in still water 300. The speed of sound in all directions should be the same and if plotted in a polar plot, all measurement points form a circle 302 where the radius of the circle indicates the speed of sound $c_0$. FIG. 5B shows the polar plot representing measurements in higher water flow 310. In this case the circle 302 is displaced towards the flow direction and deformed by the flow vector $v_{flow}$ 306 resulting in a curve 304. A feature of the new curve 304 is that all chords that cross the origin have the same length, which is 2 times c0. By calculating the length of the chords, the speed of sound in still water can be obtained, from which water temperature can be calculated. In addition, the flow vector 306 can also be obtained from the orientation of the displaced curve, from which information on the flow direction and flow speed can also be determined. This method can also be used as an acoustic 2D water flowmeter.

Figure 6:
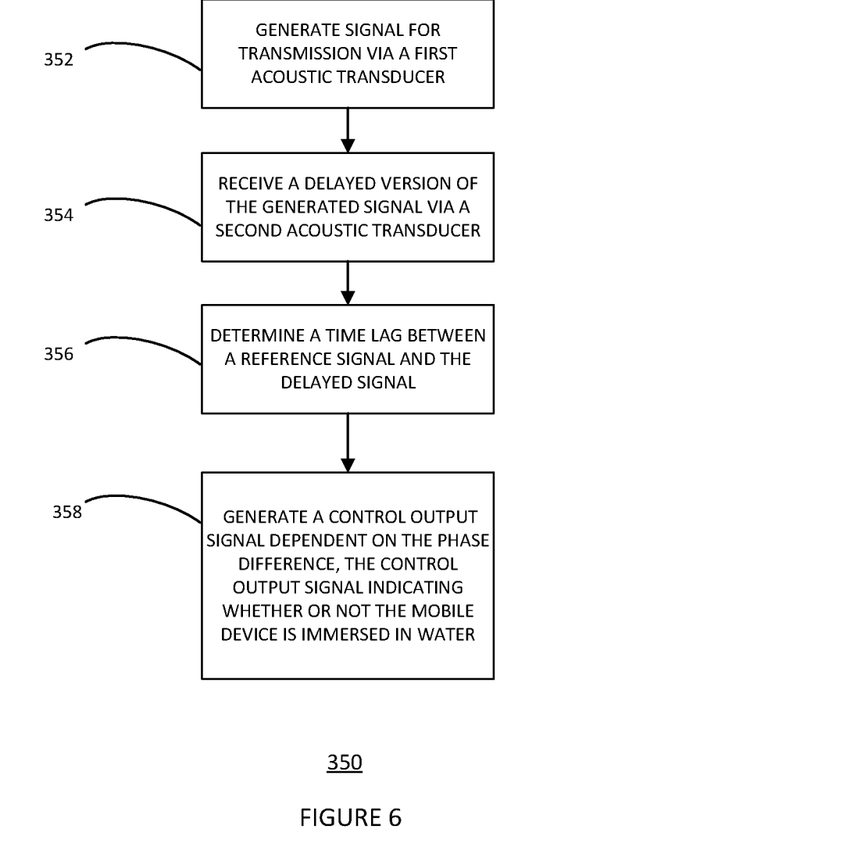
FIG. 6 illustrates a method of water immersion detection according to an embodiment.

FIG. 6 shows a method of detecting immersion in water. In step 352 a signal is generated for transmission via a first acoustic transducer. The first acoustic transducer may be an electrodynamic loudspeaker, piezo electric transducer or other suitable acoustic transducer. In step 354 a delayed version of the generated signal is received via a second acoustic transducer. The second acoustic transducer may be an electrodynamic microphone, piezo electric microphone, a speaker configured as a microphone, or other suitable acoustic transducer. In step 356 a time lag or delay is determined between a reference signal and the delayed signal. The reference signal may be the transmitted signal of step 352. In other examples the reference signal may be a further delayed signal received via a third acoustic transducer. In step 358 a control output signal may be generated dependent on the time difference, the control output signal indicating whether or not the mobile device is immersed in water.

The detailed embodiments described determine whether the sensor is immersed in water or air. However, it will be appreciated that in other examples immersion in liquids other than water may also be detected.

Examples of the liquid immersion sensor may be included in a mobile device such as a smartphone, tablet, wearable, handheld navigation device for hikers, walkie-talkie, smart watch, portable medical device which has at least one sound emitter such as a speaker or other acoustic transducer and at least one sound receiver, such as a microphone or other acoustic transducer.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness, it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A liquid immersion sensor for a mobile device comprising:
 a signal generator having a signal generator output configured to generate a reference signal for transmission via a first acoustic transducer;
 a signal receiver having a signal receiver input configured to receive a delayed version of the reference signal via a second acoustic transducer, the signal receiver further comprising a signal receiver output; and
 a controller having a first controller input configured to receive the reference signal and a second controller input coupled to the signal receiver output; wherein the controller is configured
 to determine a time lag value between the reference signal and the delayed signal; and
 to generate a control output signal dependent on the time lag, wherein the control output signal indicates whether or not the mobile device is immersed in liquid;
 wherein when the mobile device is immersed in liquid, the controller is configured to change the mobile device to a different mode of operation;
 wherein the signal receiver comprises a further signal receiver input configured to receive a further delayed version of the reference signal via a third acoustic transducer;
 wherein the controller is configured to determine a second time lag value between the reference signal and the further delayed signal; and
 wherein the controller is configured to generate the control output signal dependent on the time lag and the further time lag.

2. The liquid immersion sensor of claim 1 wherein the controller is further configured to compare the time lag value with a predetermined time lag value to generate the control output signal.

3. The liquid immersion sensor of claim 1 wherein the controller comprises
 a medium detector having a medium detector input and a medium detector output, and
 a time-lag detector configured to determine the time lag value and having a time lag output coupled to the medium detector, a first time-lag detector input coupled to the first controller input and a second time-lag detector input coupled to the second controller input,
 wherein the medium detector is configured to output a signal indicating whether the mobile device is in air or liquid, dependent on a comparison between the time lag value determined by the time lag detector and a predetermined time lag value.

4. The liquid immersion sensor of claim 3 wherein the time lag detector is configured to output a signal indicating that the mobile device is immersed in liquid if the time lag value is less than the predetermined time lag value.

5. The liquid immersion sensor of claim 3 further comprising
 a temperature calculator having a first input coupled to the medium detector output,
 a second input coupled to the time lag detector output,
 wherein in response to the medium detector indicating the mobile device is immersed in liquid, the temperature calculator is configured to determine a liquid temperature from the time lag.

6. The liquid immersion sensor of claim 1 wherein the controller is configured to determine the time lag value by cross-correlation or phase difference of the delayed signal and the reference signal.

7. A mobile device comprising the liquid immersion sensor of claim 1
 wherein the signal generator is coupled to the first acoustic transducer and the signal receiver is coupled to the second acoustic transducer.

8. The mobile device of claim 7
 further comprising a third acoustic transducer,
 wherein the signal receiver is coupled to the third acoustic transducer.

9. The liquid immersion sensor of claim 1:
 wherein in response to the control signal output indicating that the mobile device is immersed in liquid the liquid immersion sensor is configured to determine a liquid flow rate by determining
 a first speed of sound value from a first acoustic signal transmitted in a first direction and
 a second speed of sound value from a second acoustic signal transmitted in a second direction.

10. A method of sensing liquid immersion for a mobile device comprising at least three acoustic transducers, the method comprising:
 generating a signal for transmission via a first acoustic transducer;
 receiving a delayed version of the generated signal via a second acoustic transducer,
 receiving a further delayed version of the reference signal via a third acoustic transducer;
 determining a first time lag value between a reference signal and the delayed signal;
 determine a second time lag value between the reference signal and the further delayed signal; and
 generating a control output signal dependent on the first time lag and the second time lag, the control output signal indicating whether or not the mobile device is immersed in liquid;
 wherein when the mobile device is immersed in liquid, the controller is configured to change the mobile device to a different mode of operation.

11. The method of claim 10
 wherein the reference signal comprises the generated signal.

12. The method of claim 10:
 further comprising in response to the control signal output indicating that the mobile device is immersed in liquid, determining the liquid temperature from the time lag value.

13. The liquid immersion sensor of claim 1:
 wherein when the mobile device is immersed in liquid, the controller is configured to change the mobile device to a low-power consumption mode of operation.

14. The liquid immersion sensor of claim 1:
wherein when the mobile device is immersed in liquid, the controller is configured to change the mobile device to a mode of operation that lowers a touch sensitivity of a touch display on the mobile device.

* * * * *